US008978456B2

(12) United States Patent
Pursifull et al.

(10) Patent No.: US 8,978,456 B2
(45) Date of Patent: Mar. 17, 2015

(54) BRAKE BOOSTER FAULT DIAGNOSTICS

(71) Applicant: Ford Global Technologies, LLC, Dearborn, MI (US)

(72) Inventors: Ross Dykstra Pursifull, Dearborn, MI (US); Ralph Wayne Cunningham, Milan, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 210 days.

(21) Appl. No.: 13/679,503

(22) Filed: Nov. 16, 2012

(65) Prior Publication Data

US 2014/0137544 A1 May 22, 2014

(51) Int. Cl.
G01M 17/007 (2006.01)
B60T 13/66 (2006.01)
B60T 17/22 (2006.01)
B60T 13/72 (2006.01)

(52) U.S. Cl.
CPC ............... B60T 13/66 (2013.01); B60T 17/22 (2013.01); B60T 13/72 (2013.01)
USPC .......................................................... 73/121

(58) Field of Classification Search
USPC .................................................. 73/121, 129
See application file for complete search history.

(56) References Cited

U.S. PATENT DOCUMENTS

| 5,705,744 | A * | 1/1998 | Brugger et al. ................. 73/121 |
| 6,393,345 | B1 | 5/2002 | Kerns et al. |
| 6,493,617 | B1 | 12/2002 | Russell et al. |
| 6,741,918 | B2 * | 5/2004 | Kerns et al. ................... 701/30.7 |
| 6,871,918 | B2 | 3/2005 | Wild et al. |
| 6,880,534 | B2 | 4/2005 | Yoshiki et al. |
| 6,951,199 | B2 | 10/2005 | Suzuki |
| 6,990,858 | B2 | 1/2006 | Kerns et al. |
| 7,188,517 | B2 * | 3/2007 | Kerns et al. ..................... 73/121 |
| 7,467,544 | B2 * | 12/2008 | Wang et al. ..................... 73/129 |
| 7,627,407 | B2 | 12/2009 | Hirooka |
| 7,878,053 | B2 * | 2/2011 | Lehner et al. ................... 73/121 |

(Continued)

OTHER PUBLICATIONS

Leone, Thomas G. et al., "Reducing Intake Manifold Pressure During Cranking," U.S. Appl. No. 13/449,580, filed Apr. 18, 2012, 31 pages.

(Continued)

*Primary Examiner* — Eric S McCall
(74) *Attorney, Agent, or Firm* — Julia Voutyras; Alleman Hall McCoy Russell & Tuttle LLP

(57) ABSTRACT

Methods and systems for indicating brake booster degradation when braking is suspended may include comparing expected brake booster vacuum with measured brake booster vacuum, and indicating a fault when the difference between the two values exceeds a threshold. In one example, the expected brake booster vacuum is computed differently depending on whether intake manifold vacuum or vacuum from one or more vacuum-powered pumps dominates evacuation of the brake booster. Expected brake booster vacuum may be computed based on expected brake booster mass air flow and brake booster volume; when measured brake booster vacuum is less than intake manifold vacuum, expected brake booster mass air flow may be computed as a function of intake manifold vacuum and measured brake booster vacuum, whereas expected brake booster mass air flow may be computed based on flow characteristics of the pump(s) when measured brake booster vacuum is not less than intake manifold vacuum.

20 Claims, 6 Drawing Sheets

(56) References Cited

U.S. PATENT DOCUMENTS

| | | | |
|---|---|---|---|
| 8,177,309 B2 * | 5/2012 | Wang et al. ................... 303/122 |
| 2001/0035166 A1 * | 11/2001 | Kerns et al. ................... 123/494 |
| 2003/0006891 A1 | 1/2003 | Wild et al. |
| 2004/0162652 A1 * | 8/2004 | Kerns et al. .................... 701/34 |
| 2005/0165522 A1 * | 7/2005 | Lehner et al. ................... 701/34 |
| 2006/0288766 A1 * | 12/2006 | Wang et al. .................... 73/117 |
| 2007/0234716 A1 | 10/2007 | Hirooka |
| 2009/0071147 A1 * | 3/2009 | Wang et al. ................. 60/547.1 |
| 2011/0146631 A1 | 6/2011 | Konohara et al. |
| 2011/0183812 A1 | 7/2011 | Cunningham et al. |
| 2012/0096849 A1 | 4/2012 | Cunningham et al. |
| 2012/0138005 A1 | 6/2012 | White et al. |
| 2013/0283898 A1 * | 10/2013 | Rollinger et al. .......... 73/114.77 |

OTHER PUBLICATIONS

Pursifull, Ross Dykstra. et al., "Fuel System Diagnostics," U.S. Appl. No. 13/604,290, filed Sep. 5, 2012, 38 pages.

\* cited by examiner

US 8,978,456 B2

BRAKE BOOSTER FAULT DIAGNOSTICS

BACKGROUND AND SUMMARY

Vehicles may use a brake booster in an internal combustion engine which uses vacuum to amplify driver braking force. As brake booster operation depends upon the pressure in a vacuum chamber of the brake booster, it may be important to diagnose whether the vacuum chamber evacuation and replenishment functionality is working properly.

In some systems, brake booster vacuum may be supplied by the intake manifold alone. Such systems may diagnose brake booster operation based on the relationship between sensed pressures in the intake manifold and the brake booster vacuum chamber, in some examples. However, the diagnostic methods employed in such systems may require brake actuation or detection of whether a braking cycle has occurred. Further, such systems may include physical models with integrators, and therefore may produce results that are highly dependent on the initial conditions (e.g., the initial measurement of pressure in the brake booster vacuum chamber).

In addition to recognizing the deficiencies of known methods for indicating degradation in brake booster operation noted above, the inventors herein have recognized that known methods may not be sufficient in some modern engines which include multiple distinct vacuum sources in addition to the intake manifold. For example, in some systems, brake booster vacuum may be supplied by one or more pumps such as vacuum pumps and flow powered pumps (e.g., ejectors/venturis/aspirators) in addition to the intake manifold. The inventors have identified that in such systems, brake booster vacuum may be dominated by the intake manifold when a higher vacuum level is present in the intake manifold than in the brake booster vacuum chamber. However, during conditions where a higher vacuum level is present in the brake booster vacuum chamber than in the intake manifold, the inventors have identified that brake booster vacuum may be dominated by the other vacuum sources. The inventors have recognized that the flow characteristics (e.g., mass flow rate) of many vacuum sources which commonly supplement intake manifold vacuum may be determined if the pressure differential across the ports is known. In addition, the inventors have recognized that such sources may be positioned within an engine system in such a way that existing pressure sensors may be used to measure the pressure differential across the source, which may then be used to determine the suction flow rate of the source.

As such, one example approach for diagnosing faults in brake booster operation in systems supplying brake booster vacuum via the intake manifold and one or more vacuum-powered pumps includes, when braking is suspended, indicating degradation based on expected BB vacuum, the expected BB vacuum based on expected mass air flow from the BB to the intake manifold when measured BB vacuum is less than intake manifold vacuum, and based on expected mass air flow from the BB to one or more vacuum-powered pumps when measured BB vacuum is not less than intake manifold vacuum. In this way, it may be possible to determine whether the brake booster is functioning properly even in systems where several active vacuum sources (e.g., ejectors/aspirators/venturis and driven pumps) are coupled with the brake booster in addition to the intake manifold. Specifically, by dividing brake booster behavior into two simplifying conditions, evacuation via intake manifold (e.g., when measured BB vacuum is less than intake manifold vacuum) and evacuation via vacuum-powered pump(s) (e.g., when measured BB vacuum is not less than intake manifold vacuum), brake booster degradation may be indicated even in systems which include a multitude of vacuum sources evacuating the brake booster. Advantageously, depending on the positioning of the vacuum-powered pump(s) within the system, existing engine sensors may be used to determine vacuum at inlets or suction ports of the pumps, and mass air flow at the pumps may then be determined using functional expressions stored in memory which relate mass air flow and vacuum for each pump. As a further simplification, brake booster fault diagnosis may also be performed during conditions where there is no vacuum consumption (e.g., when the vehicle operator's foot is off the brake pedal).

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
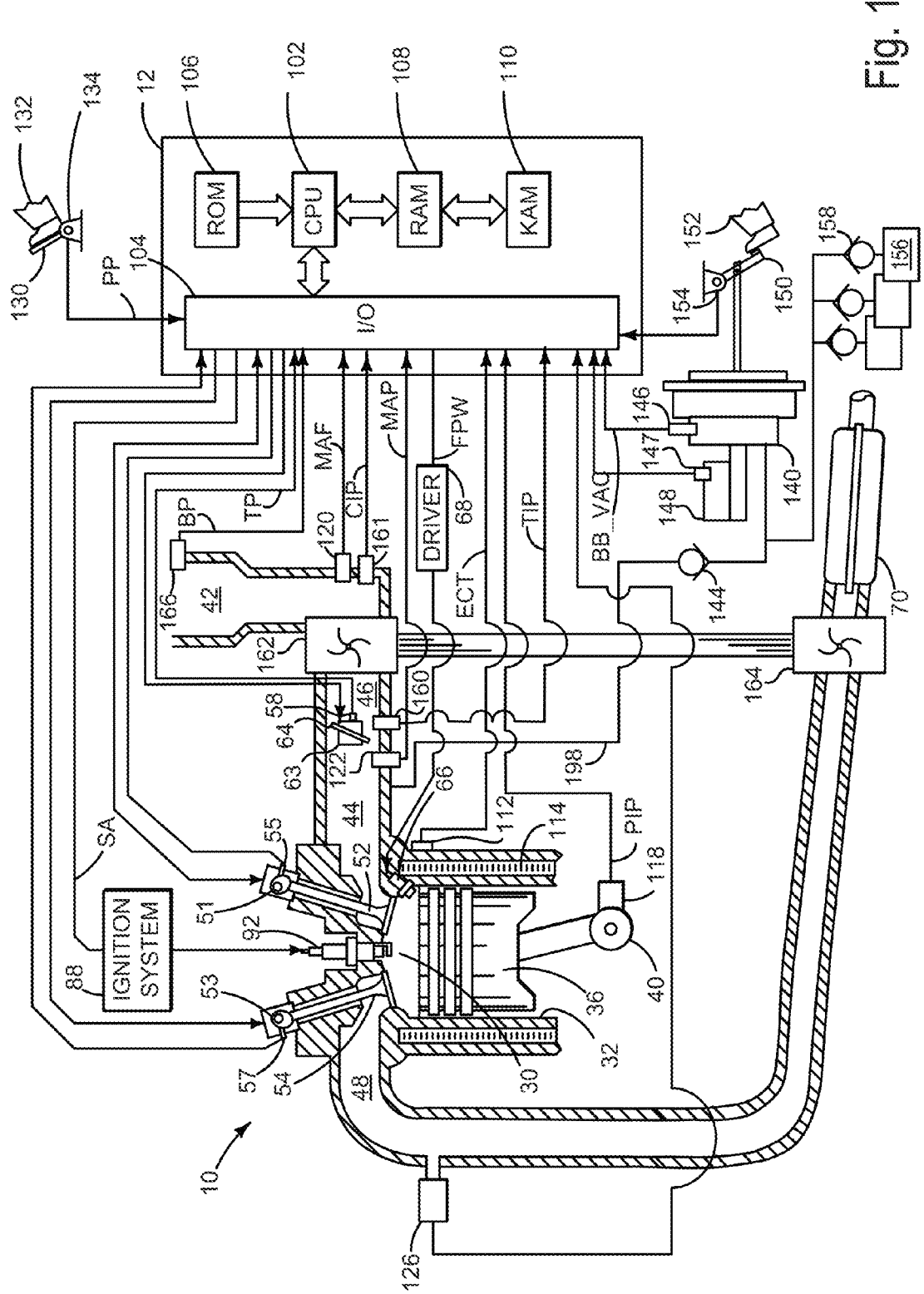
FIG. 1 shows a schematic depiction of an engine.
Figure 2:
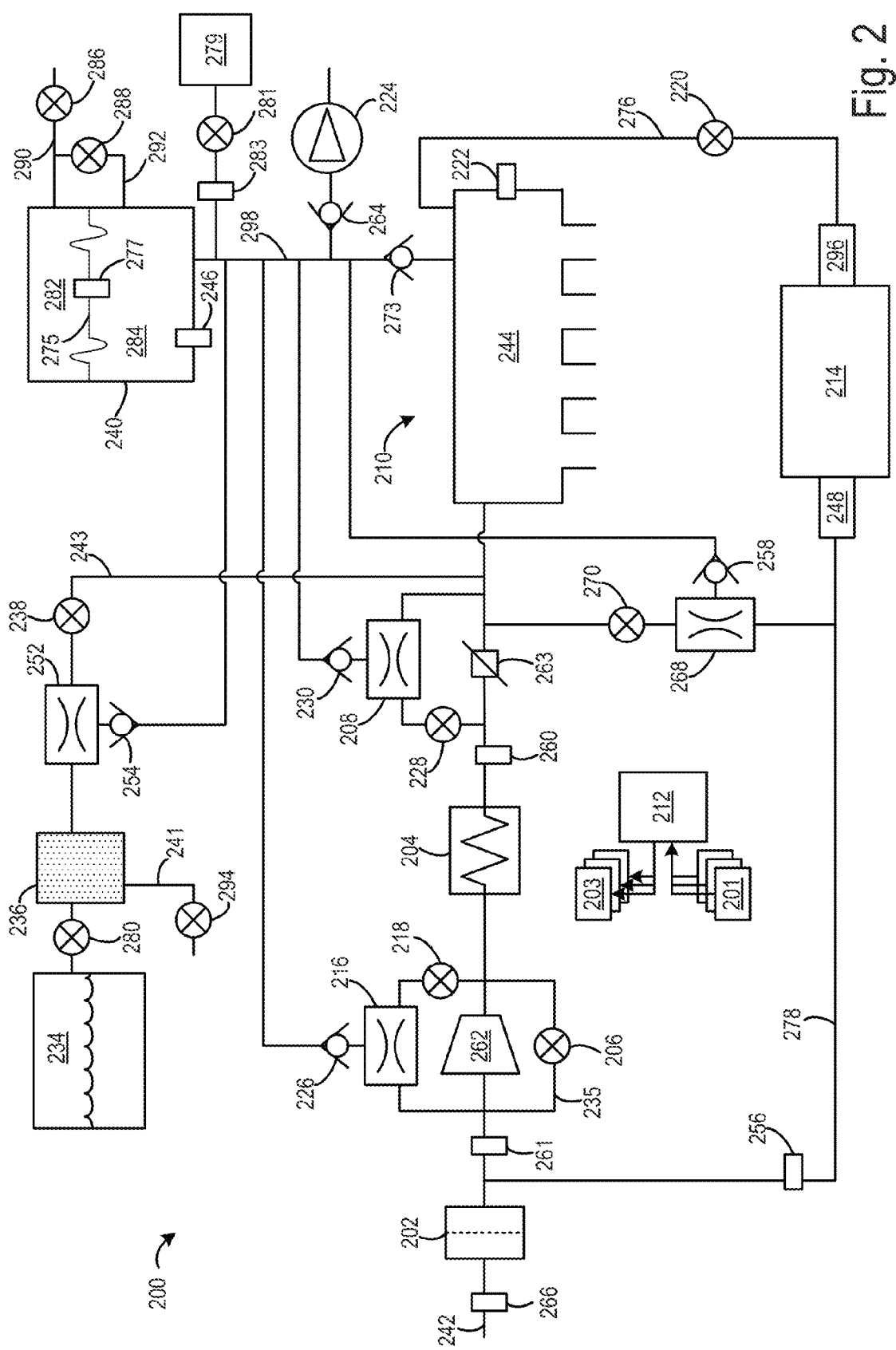
FIG. 2 shows a schematic depiction of aspects of an engine system, which may be an example embodiment of the engine system of FIG. 1.
Figure 3:
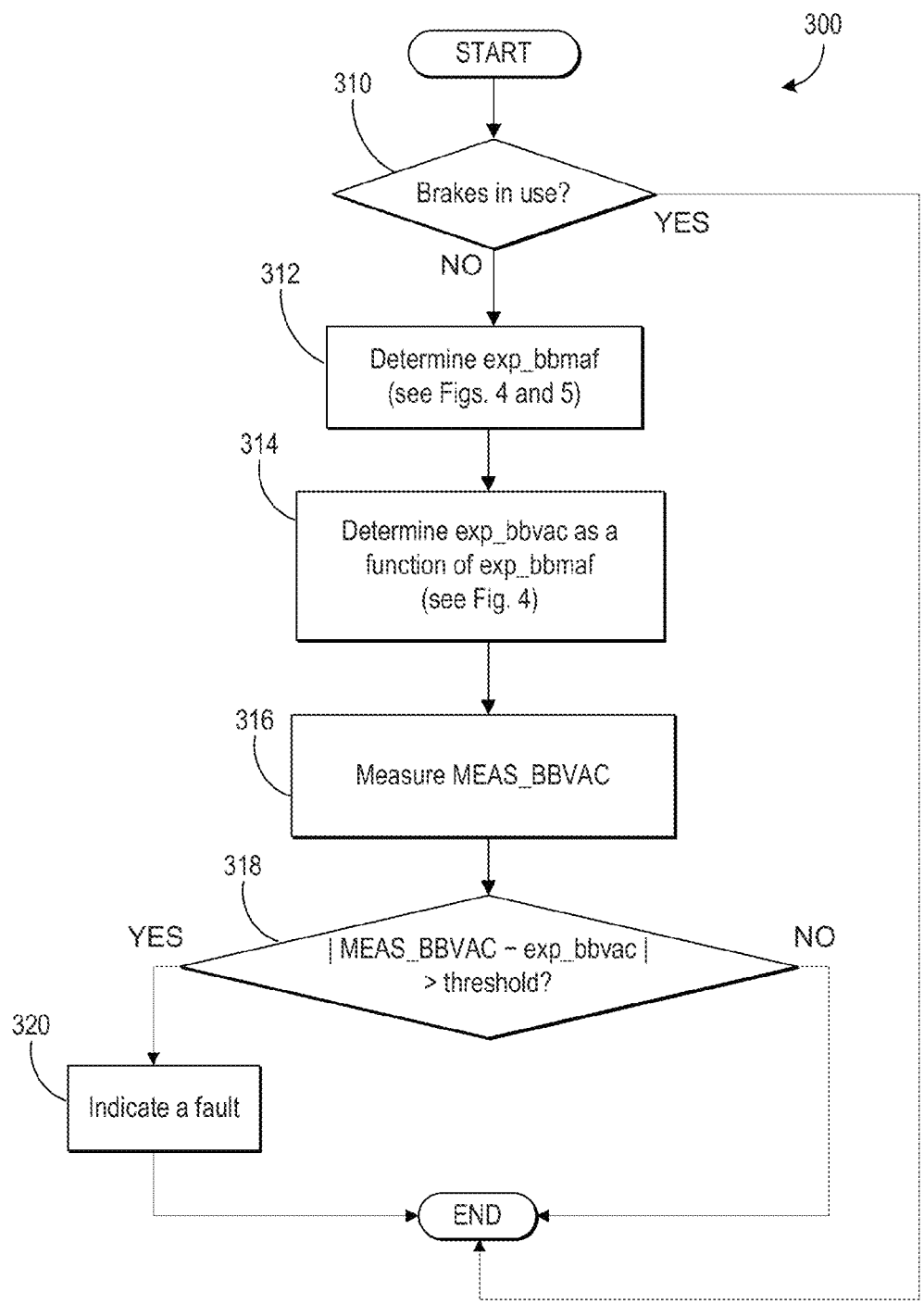
FIG. 3 is a flow chart illustrating a diagnostic method for determining whether a brake booster is functioning properly.
Figure 4:
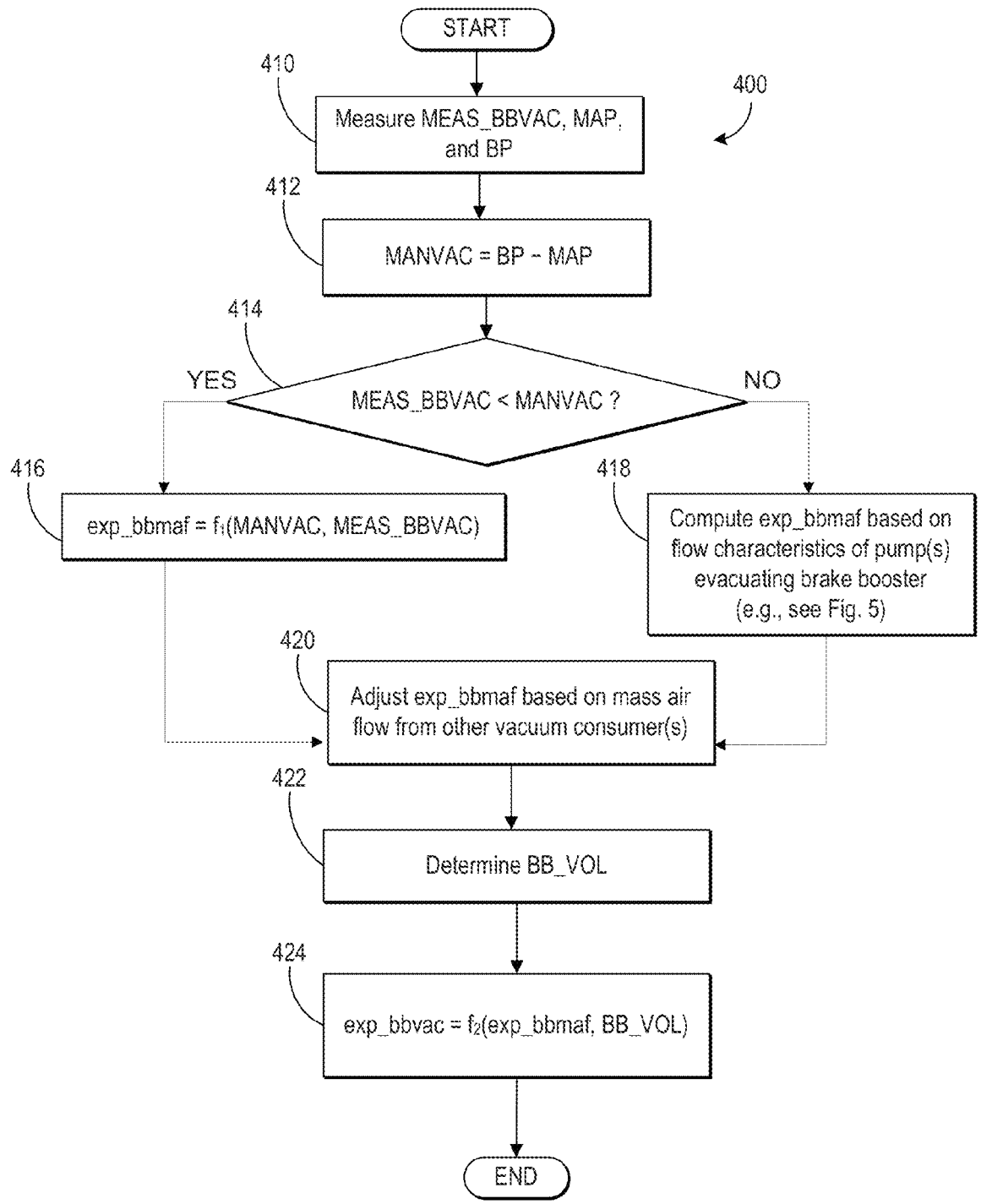
FIG. 4 is a flow chart illustrating a method for determining the expected vacuum in a brake booster vacuum chamber.
Figure 5:
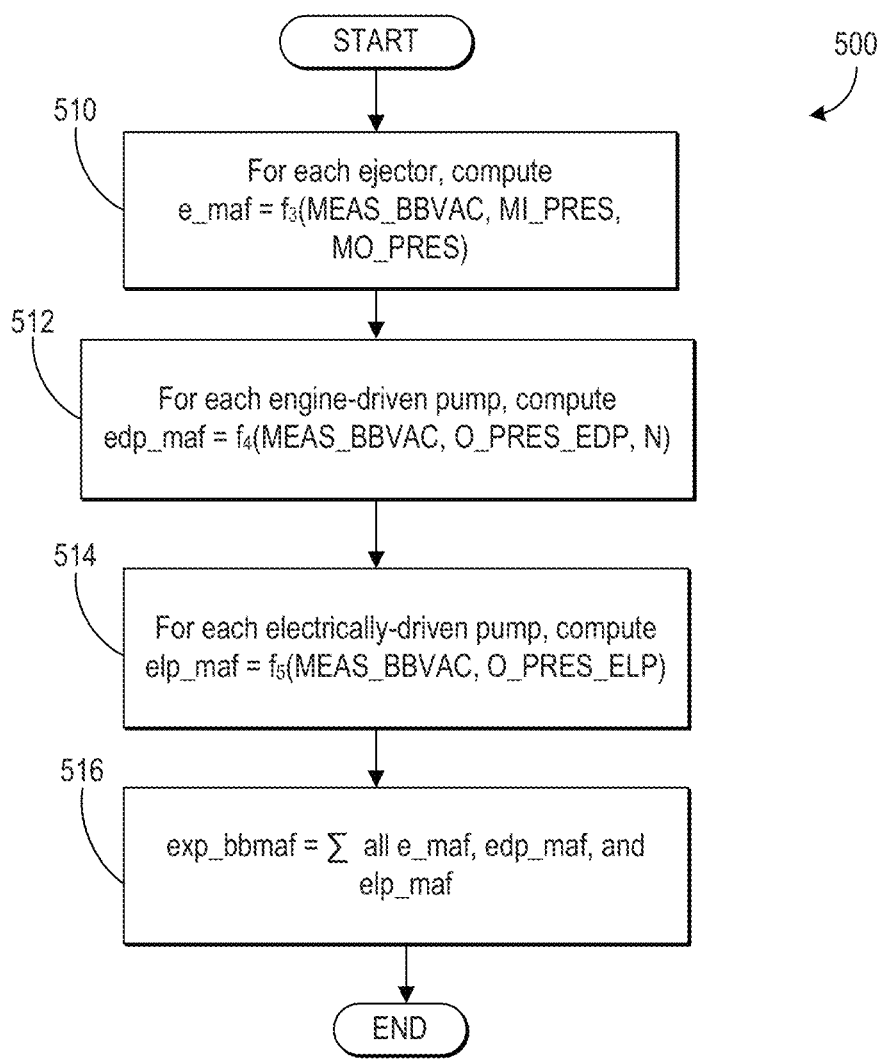
FIG. 5 depicts a method 500 for determining the expected mass air flow at the brake booster vacuum chamber port during conditions where brake booster vacuum is not less than intake manifold vacuum.
Figure 6:
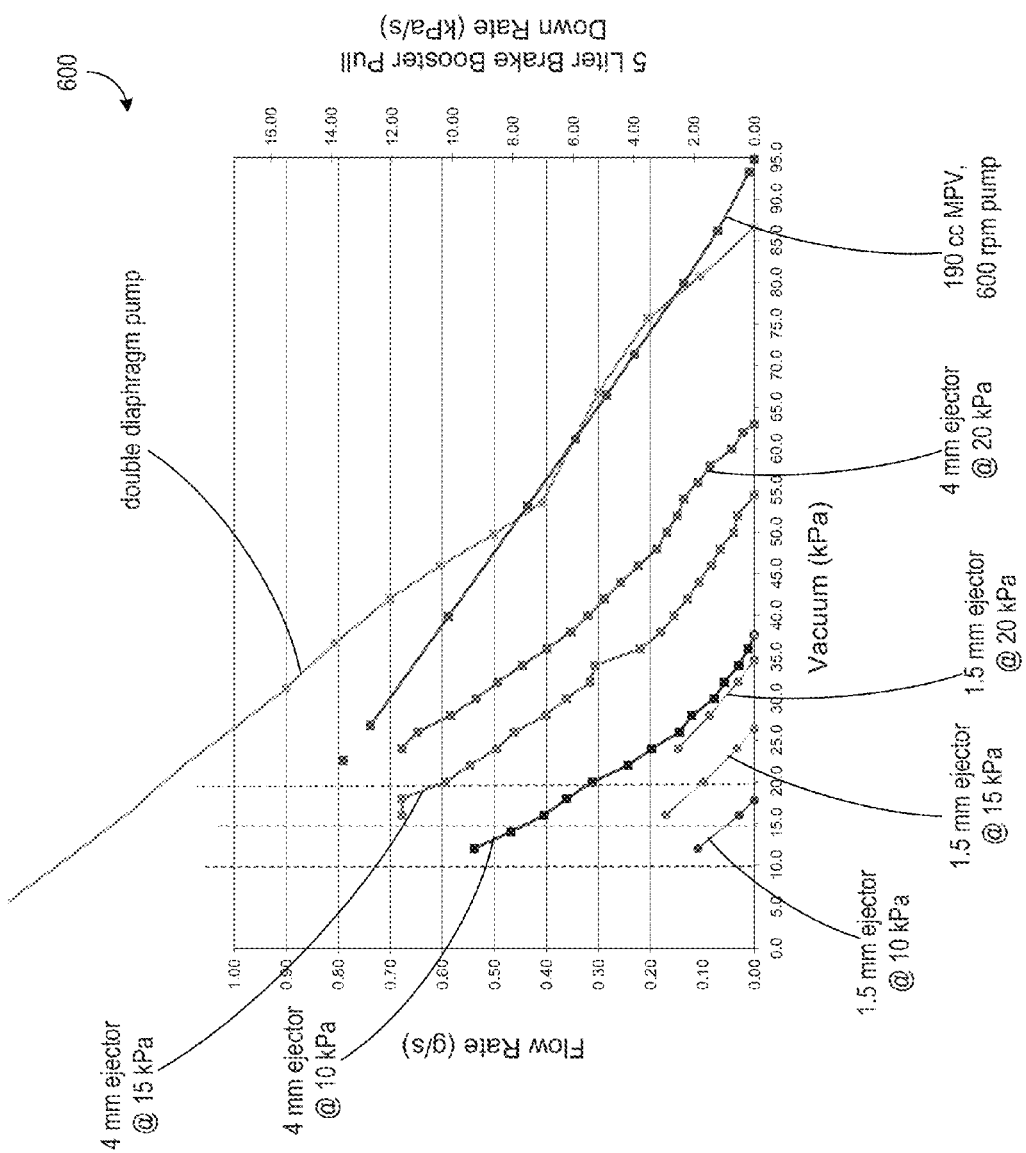
FIG. 6 depicts a graph illustrating the relationship between flow rate, vacuum, and brake booster pull down rate for various example vacuum-powered pumps.

Methods and systems for brake booster fault diagnosis when braking is suspended are provided herein. As shown in FIGS. 1 and 2, an engine system may include a brake booster to amplify vehicle operator braking force, and vacuum may be supplied to the brake booster by the intake manifold as well as one or more vacuum-powered pumps. As shown in FIG. 2, these vacuum-powered pumps may include various ejectors/aspirators/venturis as well as engine-driven or electrically-driven pumps. As shown in FIG. 3, a method for brake booster fault diagnosis may include comparing expected brake booster vacuum with measured brake booster vacuum, and indicating a fault when the difference between the two values exceeds a threshold. In one example, as shown in FIG. 4, the expected brake booster vacuum is computed differently depending on whether intake manifold vacuum or vacuum from one or more vacuum-powered pumps dominates evacuation of the brake booster. As shown in FIG. 4, expected brake booster vacuum may be computed based on expected brake booster mass air flow and brake booster volume. When measured brake booster vacuum is less than intake manifold vacuum, expected brake booster mass air flow may be computed as a function of intake manifold vacuum and measured brake booster vacuum (as shown in FIG. 4), whereas expected brake booster mass air flow may be computed based on flow characteristics of the pump(s) when measured brake booster vacuum is not less than intake manifold vacuum (as shown in FIG. 5). As shown in FIG. 6, characteristics illustrating the relationship between mass air flow and vacuum for different types of vacuum-powered pumps may be plotted in the same space. The control system may store these characteristics as functional expressions in memory, in one example, and the functional expressions may be used as a basis for computation of expected mass air flow at the brake booster during conditions where the vacuum-powered pump(s) dominate evacuation of the brake booster.

Referring to FIG. 1, internal combustion engine 10, comprising a plurality of combustion chambers 30, one of which is shown in FIG. 1, is controlled by electronic engine controller 12. As shown in FIG. 1, piston 36 is positioned within walls 32 of combustion chamber 30, and is connected to crankshaft 40. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. Alternatively, one or more of the intake and exhaust valves may be operated by an electromechanically controlled valve coil and armature assembly. The position of intake cam 51 may be determined by intake cam sensor 55. The position of exhaust cam 53 may be determined by exhaust cam sensor 57.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to the pulse width of signal FPW from controller 12. Fuel is delivered to fuel injector 66 by a fuel system (not shown) including a fuel tank, fuel pump, and fuel rail (not shown). Fuel injector 66 is supplied operating current from driver 68 which responds to controller 12. In addition, intake manifold 44 is shown communicating with optional electronic throttle 63 which adjusts a position of throttle plate 64 to control air flow from intake boost chamber 46. Compressor 162 draws air from air intake 42 to supply boost chamber 46. Exhaust gases spin turbine 164 which is coupled to compressor 162. A high pressure, dual stage, fuel system may be used to generate higher fuel pressures at injectors 66.

Engine 10 may include one or more vacuum consumers, including brake booster 140. Brake booster 140 amplifies force provided by foot 152 via brake pedal 150 to master cylinder 148 for applying vehicle brakes (not shown). Brake booster 140 may receive vacuum from a plurality of vacuum sources. As shown in FIG. 1, intake manifold 44 may provide vacuum to brake booster 140 via conduit 198. Check valve 144 ensures air flows from brake booster 140 to intake manifold 44 and not from intake manifold 44 to brake booster 140. Further, one or more additional vacuum sources 156 may provide vacuum to brake booster 140, for example via conduit 198 as shown. A check valve 158 may be arranged between the brake booster and each additional vacuum source to ensure air flows from the brake booster to the vacuum source and not from the vacuum source to the brake booster. While three additional vacuum sources 156 are shown in FIG. 1, it will be appreciated that any number of additional vacuum sources may be included in the engine, including one. For example, in some embodiments, the additional vacuum sources may include an ejector coupling an inlet and outlet of compressor 162, an ejector coupling an upstream side and a downstream side of throttle 63, and a vacuum pump, as shown in FIG. 2.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing accelerator position adjusted by foot 132; a position sensor 154 coupled to brake pedal 150 for sensing brake pedal position, a brake booster vacuum (BBVAC) sensor 146 arranged in a vacuum chamber of the brake booster; a pressure sensor 147 for sensing master cylinder pressure (e.g., hydraulic brake pressure); a knock sensor for determining ignition of end gases (not shown); a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120 (e.g., a hot wire air flow meter); barometric pressure from a barometric pressure sensor 166 coupled to intake 42; a measurement of compressor inlet pressure (CIP) from CIP sensor 161; a measurement of throttle inlet pressure (TIP) from a TIP sensor 160; a measurement of throttle position from sensor 58; and a measurement of crankcase vent pressure (CVP) from a CVP sensor coupled in a passage connecting a crankcase of engine 10 with intake 42 (not shown).

In some embodiments, the engine may be coupled to an electric motor/battery system in a hybrid vehicle. The hybrid vehicle may have a parallel configuration, series configuration, or variation or combinations thereof. Further, in some embodiments, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft.

Finally, during the exhaust stroke, the exhaust valve 54 opens to release the combusted air-fuel mixture to exhaust manifold 48 and the piston returns to TDC. Note that the above is described merely as an example, and that intake and exhaust valve opening and/or closing timings may vary, such as to provide positive or negative valve overlap, late intake valve closing, or various other examples.

FIG. 2 shows aspects of an engine system 200, which may be an example embodiment of engine 10 of FIG. 1. As detailed below, engine system 200 includes a brake booster 240 coupled with a plurality of vacuum-producing pumps. For the sake of example, several vacuum-producing pumps are shown coupled with brake booster 240 in engine system 200: an ejector arranged in parallel with a compressor, an ejector arranged in parallel with an intake throttle, an ejector arranged at an outlet of a crankcase ventilation system, an ejector arranged at an outlet of a fuel vapor purge system, and an electrically-powered or engine-powered vacuum pump. However, it will be appreciated that engine systems may include fewer vacuum-producing pumps, or even a single vacuum-producing pump, without departing from the scope of this disclosure.

Engine system 200 includes engine 210. Engine 210 may be virtually any volatile-liquid or gas-fueled internal combustion engine, e.g., a port- or direct-injection spark ignition or compression ignition engine. Engine system 200 further includes controller 212, which corresponds to controller 12 of FIG. 1 and may be any electronic control system of the engine system or of the vehicle in which the engine system is installed. Controller 212 may be configured to make control decisions based at least partly on input from one or more sensors 201 within the engine system, and may control actuators 203 based on the control decisions. For example, controller 212 may store computer-readable instructions in memory, and actuators 203 may be controlled via execution of the instructions.

Atmospheric air entering intake 242 may be filtered by an air filter 202. Downstream of air filter 202, a turbocharger compressor 262 may be arranged along intake 242. The compressor 262 may be at least partially driven by a turbine (e.g. via a shaft) arranged along an exhaust passage of the engine, such as turbine 164 of FIG. 1. A compressor-bypass valve (CBV) 206 may be provided in a compressor-bypass passage 235. One end of compressor-bypass passage 235 may be coupled downstream of air filter 202 and upstream of compressor 262, and the other end of compressor-bypass passage 235 may be coupled downstream of compressor 262. CBV 206 may allow compressed air to be recirculated into the intake 242 upstream of compressor 262. For example, CBV 206 may open to recirculate compressed air upstream of compressor 262 to release pressure in the intake system of a turbocharged vehicle when a throttle is lifted or closed in order to reduce the effects of compressor surge loading. In one particular example, CBV 206 is vacuum-actuated.

In some embodiments, a charge air cooler 204 may be provided in intake 242 downstream of compressor 262. Charge air cooler 204 may cool intake air that has been heated due to compression by compressor 262, in order to increase the density of the air charge provided to engine 210. By increasing the air charge density, combustion efficiency of the engine 210 may be increased.

A throttle valve 263 may be provided in intake 242 downstream of charge air cooler 206, and upstream of intake manifold 244. Like intake manifold 44 of FIG. 1, intake manifold 244 is configured to supply intake air from intake 242, or an air-fuel mixture, to one or more combustion chambers of engine 210. The combustion chambers may be arranged above a lubricant-filled crankcase 214, in which reciprocating pistons of the combustion chambers rotate a crankshaft. The reciprocating pistons may be substantially isolated from the crankcase via one or more piston rings, which suppress the flow of the air-fuel mixture and of combustion gasses into the crankcase. Nevertheless, a significant amount of fuel vapor, unburned air, and combustion products may 'blow by' the piston rings and enter the crankcase over time. To reduce the degrading effects of the fuel vapor on the viscosity of the engine lubricant and to reduce the discharge of the vapor into the atmosphere, the crankcase may be continuously or periodically ventilated via positive crankcase ventilation (PCV) system 211. In the configuration shown in FIG. 2, PCV system 211 includes a PCV valve 220 arranged in line 276, which couples intake manifold 244 and crankcase 214 via intake-protecting oil separator 296. The PCV valve may be any fixed or adjustable portioning valve. In one embodiment, the direction of ventilation air flow through the crankcase depends on the relative values of the manifold air pressure (MAP) and the barometric pressure (BP). Under unboosted or minimally boosted conditions (e.g., when BP>MAP) and when PCV valve 220 is open, air enters the crankcase via line 278 and is discharged from the crankcase to intake 242 (and then to intake manifold 244) via line 276. In some embodiments, a second oil separator 248 may be present between crankcase 214 and line 278, as shown.

Engine system 210 further includes a fuel vapor purge system 280. Fuel vapor purge system 280 may include a fuel tank which stores the volatile liquid fuel combusted in engine 210, and an adsorbent canister through which the fuel tank is vented to atmosphere to avoid emission of fuel vapors from the fuel tank and into the atmosphere. During selected conditions, fuel vapors stored in fuel vapor purge system 280 may be purged to intake manifold 244 via purge line 243 and canister-purge valve 238. A canister check valve 234 may also be included in purge line 243 to prevent (boosted) intake manifold pressure from flowing gases into the purge line in the reverse direction.

Engine system 200 includes a brake booster 240. Brake booster 240 includes a first chamber 282 and a second chamber 284, separated by a diaphragm 275. Second chamber 284 may be coupled with one or more vacuum sources. During non-braking conditions, when the brake pedal (e.g., brake pedal 150 of FIG. 1) is not applied, a valve 286 controlling communication between the first chamber and atmosphere may be closed and a valve 288 controlling communication between the first and second chambers may be open. Accordingly, the first and second chambers may be at substantially the same pressure, which may be a negative pressure (vacuum), during non-braking conditions. In contrast, when the brake pedal is applied, valve 288 at least partially closes, and valve 286 at least partially opens to allow air from atmosphere into the first chamber, thereby increasing the pressure in the first chamber. The pressure differential between the first and second chambers supplements the force applied to the brake pedal to push on the master cylinder piston (not shown). By varying the opening amount of valve 288, the brake boosting force may be varied (e.g., fully closing valve 288 may maximize the brake boosting force, whereas barely closing valve 288 may provide a minimal amount of brake boosting force). Similarly, by varying the opening amount of valve 286, the brake boosting force may be varied (e.g., fully opening valve 286 may maximize the brake boosting force, whereas barely opening valve 286 may provide a minimal amount of brake boosting force). A position of diaphragm 275, which may depend on the pressure differential between the first and second chambers, may be inferred from a measurement of hydraulic brake line pressure. Alternatively, the position of diaphragm 275 may be sensed by a diaphragm position sensor 277.

As shown in FIG. 2, second chamber 284 of brake booster 240 may be coupled with and may receive vacuum from one or more vacuum sources. In the example shown in FIG. 2, the vacuum sources coupled with second chamber 284 include intake manifold 244, a vacuum pump 224, and four ejectors. However, it will be appreciated that fewer, or more, vacuum sources for the brake booster may be included in engine system 200.

Intake manifold 244 may be a vacuum source for brake booster 240. Second chamber 284 may be coupled to intake manifold 244 via a check valve 273. Check valve 273 allows air to flow to intake manifold 244 from brake booster 240 and limits air flow to brake booster 240 from intake manifold 244. During conditions where the intake manifold pressure is negative, the intake manifold may be a vacuum source for brake booster 240.

A vacuum pump such as vacuum pump 224 may be another vacuum source for brake booster 240. Vacuum pump 224 may be electrically driven, engine driven, or driven by another suitable means. As shown in FIG. 2, vacuum pump 224 is arranged in line 213, and line 213 is coupled with second chamber 284 of brake booster 240 via line 298. Vacuum pump 224 may be selectively operated via a control signal from controller 212 to supply vacuum to brake booster 240. A check valve 264 upstream of the vacuum pump in line 213 may allow air flow from brake booster 240 to vacuum pump 224, and may limit air flow to brake booster 240 from vacuum pump 224.

An ejector 216 arranged in parallel with compressor 262 may be another source of vacuum for brake booster 240. As shown, ejector 216 is arranged in a line 207 connecting an inlet of the compressor with an outlet of the compressor. A valve 218 intermediate the compressor outlet and ejector 216 in line 207 may be controlled to allow compressed intake air to provide a motive flow through ejector 216, generating vacuum at a suction port 221. Suction port 221 may be coupled with a vacuum consumer, and the motive flow of compressed intake air through ejector 216 may generate vacuum for the vacuum consumer. For example, as shown in FIG. 2, suction port 221 may be coupled with brake booster 240 via lines 223 and 298. A check valve 226 may be arranged in line 223 to prevent reverse flow in line 223 (e.g., flow of compressed intake air towards line 298 during conditions when the pressure in line 298 is less than the negative pressure generated by motive flow through ejector 216).

Similarly, an ejector 208 arranged substantially in parallel with throttle 263 may be a source of vacuum for brake booster 240. As shown, ejector 208 is arranged in a line 209 connecting an inlet of the throttle with intake 242 downstream of the throttle (and also downstream of a juncture of line 276 and intake 242). A valve 228 intermediate the throttle inlet and ejector 208 in line 209 may be controlled to allow throttled intake air to provide a motive flow through ejector 208, generating vacuum at a suction port 225. Suction port 225 may be coupled with a vacuum consumer, and the motive flow of compressed intake air through ejector 208 may generate vacuum for the vacuum consumer. For example, as shown in FIG. 2, suction port 225 may be coupled with brake booster 240 via lines 237 and 298. A check valve 230 may be arranged in line 237 to prevent reverse flow in line 237 (e.g., flow of throttled intake air towards line 298 during conditions when the pressure in line 298 is less than the negative pressure generated by motive flow through ejector 208).

Fuel vapor purge system 280 may be an additional vacuum source for brake booster 240. Purge line 243 may include an ejector 252. Fuel vapors purged from fuel vapor purge system 280 may provide a motive flow through ejector 252, generating vacuum at a suction port 227. Suction port 227 may be coupled with a vacuum consumer, and the motive flow of fuel vapors through ejector 252 may generate vacuum for the vacuum consumer. For example, as shown in FIG. 2, suction port 227 may be coupled with brake booster 240 via lines 229 and 298. A check valve 254 may be arranged in line 229 to prevent reverse flow in line 229 (e.g., flow of purge vapors towards line 298 during conditions when the pressure in line 298 is less than the negative pressure generated by motive flow through ejector 252).

PCV system 211 may also be a vacuum source for brake booster 240. Line 276 of PCV system 211 may include an ejector 252. PCV valve 220 may be controlled to allow a motive crankcase ventilation flow through ejector 268, generating vacuum at a suction port 233. Suction port 233 may be coupled with a vacuum consumer, and the motive flow of fuel vapors through ejector 268 may generate vacuum for the vacuum consumer. For example, as shown in FIG. 2, suction port 233 may be coupled with brake booster 240 via lines 239 and 298. In this way, PCV system 211 may be a vacuum source for the brake booster. A check valve 258 may be arranged in line 239 to prevent reverse flow in line 239 (e.g., flow of crankcase gases towards line 298 during conditions when the pressure in line 298 is less than the negative pressure generated by motive flow through ejector 268).

One or more other vacuum consumers 279 may be coupled with line 298, depending on an opening state of a valve 281. For example, the other vacuum consumers may include charge motion control valves, a turbocharger turbine wastegate, compressor bypass valves (e.g., CBV 206), variable engine mounts, wheel-to-axle disconnect, a PCV system (e.g., PCV system 211), etc. During conditions where other vacuum consumers 279 are leaking air into line 298, the expected mass air flow leaving the brake booster vacuum chamber may be adjusted based on the amount of air leaked from other vacuum consumers 279 into line 298. In the example shown in FIG. 2, a mass air flow sensor 283 is arranged between line 298 and valve 281, and sensor 283 may sense the mass air flow leaving other vacuum consumers 279 and provide this information to the control system. The control system may then use this information to adjust the computed expected mass air flow at the brake booster, as will be described with respect to FIG. 4.

Sensors 201 of controller 212 may include various pressure sensors, and information gathered by these sensors may be used to diagnose brake booster vacuum replenishment. In the example embodiment shown in FIG. 2, sensors 201 include a compressor inlet pressure (CIP) sensor 261, a throttle inlet pressure (TIP) sensor 260, a crankcase vent pressure (CVP) sensor 256, an intake manifold air pressure (MAP) sensor 222, a barometric pressure (BP) sensor 266, a brake booster vacuum (BBVAC) sensor 246, and a diaphragm position sensor 277. BBVAC sensor 246 may be a gauge sensor reading vacuum, and may transmit data as negative vacuum (e.g., pressure) to controller 212. MAP sensor 222 may be an absolute sensor, and controller 212 may subtract the value sensed by MAP sensor 222 from the sensed barometric pressure value to determine intake manifold negative pressure (e.g., intake manifold vacuum).

FIG. 3 depicts a diagnostic method 300 for determining whether a brake booster is functioning properly, e.g., whether a brake booster fault exists. It will be appreciated that in the diagnostic methods described herein, expected or estimated parameter values will be represented in lowercase, whereas measured (e.g., sensed) values will be represented in uppercase. For example, MEAS_BBVAC refers to the vacuum in the brake booster as measured by BBVAC sensor 246 at a given time, whereas exp_bbvac refers to the expected vacuum in the brake booster at a given time.

At 310, method 300 includes determining whether the brakes are currently in use. In one example, the controller may make this determination based on sensed brake pedal position (e.g., signal PP shown in FIG. 1).

If the answer at 310 is YES, the brakes are currently in use, and method 300 ends. Otherwise, if the answer at 310 is NO indicating that the brakes are not in use, method 300 proceeds to 312. At 312, method 300 includes determining the expected mass air flow rate at the brake booster (exp_bbmaf). For example, as described below with respect to FIGS. 4 and 5, the procedure for determining bbmaf may depend on whether the measured value of brake booster vacuum (MEAS_BBVAC) is less than the current value of intake manifold vacuum (MANVAC). If MEAS_BBVAC is less than MANVAC, intake manifold vacuum may dominate evacuation of the brake booster vacuum chamber, and exp_bbmaf may be determined as a function of MANVAC and MEAS_BBVAC. Otherwise, if MEAS_BBVAC is not less than MANVAC, vacuum from one or more vacuum-powered pumps may dominate evacuation of the brake booster vacuum chamber, and exp_bbmaf may be determined based on flow characteristics of the pumps evacuating the brake booster vacuum chamber (e.g., as described below with respect to FIG. 5).

After 312, method 300 continues to 314. At 314, method 300 includes determining the expected vacuum in the brake booster vacuum chamber (exp_bbvac) as a function of exp_bbmaf. For example, as described below with respect to FIG. 4, exp_bbvac may be determined as a function of the current volume of the brake booster (BB_VOL) and exp_bbmaf. In some examples, the function may be a brake booster actuator model, and BB_VOL may be computed based on a position of an actuator of the brake booster (e.g., diaphragm 275 shown in FIG. 2).

After 314, method 300 proceeds to 316. At 316, method 300 includes measuring MEAS_BBVAC. For example, as shown in FIG. 1, controller 12 may receive a signal MEAS_BBVAC from BBVAC sensor 146. As described above, the BBVAC sensor may be a gauge sensor reading vacuum, and may transmit data as negative vacuum (e.g., pressure).

After 316, method 300 proceeds to 318. At 318, method 300 includes determining whether the difference between MEAS_BBVAC and exp_bbvac is greater than a threshold (e.g., whether the absolute value of MEAS_BBVAC minus exp_bbvac is greater than a threshold). The threshold may be a predetermined threshold, in some examples. In other examples, the threshold may vary based on engine operating conditions.

If the difference between MEAS_BBVAC and exp_bbvac exceeds the threshold, the answer is YES and a brake booster fault is present. In this case, method 300 proceeds to 320 to indicate a fault. Indicating a fault may include the controller setting a value of a flag which may trigger further diagnostic routines, illuminating an LED or displaying digital information on a user interface which will alert the vehicle operator of the brake booster fault, etc.

Otherwise, if the answer at 318 is NO, the magnitude of the difference between MEAS_BBVAC and exp_bbvac indicates that the brake booster is functioning properly, and method 300 ends. In other examples, however, the magnitude of the difference between MEAS_BBVAC and exp_bbvac may be stored in memory of the control system. The controller may track the magnitude of the difference over time, and may indicate an impending fault based on an increase in the magnitude of the difference over time. In this way, brake booster faults may be identified before the fault reaches a critical level.

FIG. 4 depicts a method 400 for determining the expected vacuum in the brake booster vacuum chamber (referred to herein as exp_bbvac). For example, the difference between exp_bbvac (as determined via method 400) and MEAS_BBVAC may be computed at step 318 of method 300, and a fault may be indicated at 320 depending on the magnitude of the computed difference.

At 410, method 400 includes measuring MEAS_BBVAC, MAP, and BP. For example, as shown in FIG. 1, controller 12 may receive MEAS_BBVAC from BBVAC sensor 146, MAP from MAP sensor 122, and BP from BP sensor 166.

After 410, method 400 proceeds to 412. At 412, method 400 includes computing the current intake manifold vacuum (MANVAC). In some systems, the MAP sensor may sense absolute pressure, and thus MANVAC may be computed as the difference between BP and MAP, as shown.

After 412, method 400 proceeds to 414. At 414, method 400 includes determining whether MEAS_BBVAC is less than MANVAC. For example, the determination may be made by controller 12.

If the answer at 414 is YES, indicating that MEAS_BBVAC is less than MANVAC, method 400 proceeds to 416. In this case, intake manifold vacuum may dominate brake booster evacuation, even though other vacuum sources (e.g., one or more vacuum-producing pumps) may be present and may contribute to brake booster vacuum. As such, for the purposes of diagnosis of brake booster faults, expected mass air flow at the brake booster vacuum chamber port may be computed as a function $f_1$ of MANVAC and MEAS_BBVAC, independent of parameters related to flow through any vacuum-producing pumps present in the systems. In one example, the function may be the product of C1 and the square root of the difference of MANVAC and MEAS_BBVAC (i.e., C1*$\sqrt{}$(MANVAC−MEAS_BBVAC)), where C1 is a constant determined based on dimensions of various engine components such as the conduit connecting the intake manifold and the brake booster, and/or based on engine operating conditions. However, it will be appreciated that in other examples, the mass air flow through vacuum-producing pumps and/or any other vacuum sources of the engine system may also serve as a basis for the computation of exp_bbmaf when MEAS_BBVAC is less than MANVAC. After 416, method 400 proceeds to 420.

Otherwise, if the answer at 414 is NO and MEAS_BBVAC is not less than MANVAC, method 400 proceeds to 418. At 418, method 400 includes computing exp_bbmaf based on flow characteristics of one or more vacuum-producing pumps evacuating the brake booster. For example, the computation may be performed in accordance with the method of FIG. 5, based on pump flow characteristics such as those shown in FIG. 6. After 418, method 400 proceeds to 420.

At 420, method 400 includes adjusting exp_bbmaf based on mass air flow from other vacuum consumers (e.g., mass air flow from other vacuum consumers 279 into line 298 of FIG. 2). The mass air flow from other vacuum consumers may be sensed by a mass air flow sensor such as sensor 283 of FIG. 2, or may be determined by another means. In some examples, rather than adjusting exp_bbmaf based on mass air flow from the other vacuum consumers, the control system may control valve 281 such that it is shut during the brake booster diagnostic procedure. Accordingly, in such examples, mass air flow sensor 283 may be omitted.

At 422, method 400 includes determining the volume of the vacuum chamber of the brake booster (BB_VOL). The determination may be made based on known dimensions of the brake booster stored in memory (e.g., circumference) as well as the position of the diaphragm of the brake booster (e.g., diaphragm 275 of FIG. 2). The position of the diaphragm of the brake booster may be sensed by a position sensor such as sensor 277 of FIG. 2, in some examples. In other examples, other means may be used to determine the position of the diaphragm of the brake booster. Alternatively, BB_VOL may be determined by another method.

After 422, method 400 proceeds to 424. At 424, method 400 includes computing exp_bbvac as a function $f_2$ of exp_bbmaf and BB_VOL. The function may also include parameters such as temperature, the ideal gas constant, etc.

FIG. 5 depicts a method 500 for determining the expected mass air flow at the brake booster vacuum chamber port (exp_bbmaf) during conditions where brake booster vacuum is not less than intake manifold vacuum. During such conditions, as shown in FIG. 5, exp_bbmaf may be computed based on mass air flow through one or more vacuum-producing pumps coupled with the brake booster vacuum chamber, and independent of other vacuum sources such as the intake manifold (e.g., as air may not flow from the brake booster to the intake manifold during conditions where MEAS_BBVAC is not less than MANVAC). However, it will be appreciated that in other embodiments, other potential vacuum sources such as the intake manifold may factor into the calculation of exp_bbmaf even when MEAS_BBVAC is not less than MANVAC. Mass air flow through each vacuum-producing pump may be computed using a functional expression which approximates the behavior of the pump (e.g., the relationship between flow rate and vacuum at an inlet/suction port of the pump, as depicted in FIG. 6 for several example pumps).

At 510, method 500 includes computing the mass air flow into the suction port of each ejector having a suction port coupled with the brake booster vacuum chamber port (referred to as e_maf herein). It will be appreciated that the term "ejector" as used herein refers to ejectors as well as other pumps which operate in accordance with the venturi effect, such as jet pumps, aspirators, venturis, etc. As shown, e_maf for a given ejector may be a function $f_3$ of MEAS_BBVAC, the pressure at the motive inlet of the ejector (MI_PRES), and the pressure at the motive outlet of the ejector (MO_PRES). Advantageously, depending on the positioning of the ejector within the engine system, it may be possible to obtain MI_PRES and MO_PRES from pre-existing sensors. For example, in system 200 shown in FIG. 2, TIP sensor 260 may provide MI_PRES for ejector 208, whereas MAP sensor 222 may provide MO_PRES for ejector 208. Similarly, CVP sensor 256 may provide MI_PRES for ejector 268, whereas MAP sensor 222 may provide MO_PRES for ejector 268. However, in other examples, e_maf may be computed in another way without departing from the scope of this disclosure. The number of ejectors evacuating the brake booster may determine how many values of e_maf are computed at step 510. For example, in system 200 of FIG. 2, four ejectors are coupled with the brake booster vacuum chamber. Accordingly, in this system, four e_maf values are computed, one for each ejector.

After 510, method 500 proceeds to 512. At 512, method 500 includes computing the mass air flow into the inlet of each engine-driven vacuum pump coupled with the brake booster vacuum chamber port (referred to as edp_maf herein). As shown, edp_maf for a given engine-driven vacuum pump may be a function $f_4$ of MEAS_BBVAC, the pressure at the outlet of the pump (O_PRES_EDP), and engine speed (N). O_PRES_EDP may be measured by a sensor arranged at the outlet of the pump. Advantageously, the outlet of the pump may lead to atmosphere, and thus a pre-existing BP sensor such as BP sensor 266 of FIG. 2 may supply O_PRES_EDP. For example, vacuum pump 224 of FIG. 2 may be an engine-driven vacuum pump. As no other engine-driven vacuum pumps are included in system 200, only one edp_maf computation would be performed for system 200. Alternatively, vacuum pump 224 of FIG. 2 may be an electrically-driven vacuum pump, in which case no edp_maf computations would be performed.

After 512, method 500 proceeds to 514. At 514, method 500 includes computing the mass air flow into the inlet of each electrically-driven vacuum pump coupled with the brake booster vacuum chamber port (referred to as elp_maf herein). As shown, elp_maf for a given electrically-driven vacuum pump may be a function $f_5$ of MEAS_BBVAC and the pressure at the outlet of the pump (O_PRES_ELP). O_PRES_ELP may be measured by a sensor arranged at the outlet of the pump. Advantageously, the outlet of the pump may lead to atmosphere, and thus a pre-existing BP sensor such as BP sensor 266 of FIG. 2 may supply O_PRES_ELP. For example, vacuum pump 224 of FIG. 2 may be an electrically-driven vacuum pump. As no other electrically-driven vacuum pumps are included in system 200, only one elp_maf computation would be performed for system 200. Alternatively, vacuum pump 224 of FIG. 2 may be an engine-driven vacuum pump (e.g., as discussed above for step 512), in which case no elp_maf computations would be performed.

After 514, method 500 proceeds to 516. At 516, method 500 includes computing exp_bbmaf as the sum of all computed values of e_maf, edp_maf, and elp_maf. For example, with reference to system 200 of FIG. 2, exp_bbmaf would be computed as the sum of e_maf for ejector 216, e_maf for ejector 208, e_maf for ejector 252, e_maf for ejector 268, and either edp_maf or elp_maf for vacuum pump 224, depending on whether vacuum pump 224 is an engine-driven vacuum pump or an electrically-driven vacuum pump. As described above with reference to FIG. 3, the value of exp_bbmaf computed at step 516 may be used as a basis for the determination of exp_bbvac at step 314 of method 300. For example, as described above for FIG. 4, exp_bbvac may be a function of exp_bbmaf and the volume of the brake booster vacuum chamber.

Graph 600 of FIG. 6 depicts the relationship between flow rate, vacuum, and brake booster pull down rate for various example vacuum-powered pumps: a 4 mm ejector at downstream pressures of 10, 15, and 20 kPa, a 1.5 mm ejector at downstream pressures of 10, 15, and 20 kPa, a double diaphragm electrically-driven pump (driven at a substantially constant speed), and a 190 cc MVP, 600 rpm speed engine-driven pump. In this example, the brake booster is a 5 liter brake booster, and the brake booster pull down rate represents the rate at which pressure decreases (and vacuum increases) at a port of the vacuum chamber of the brake booster.

As shown in graph 600, flow characteristics of ejectors, engine-driven pumps, and electrically-driven pumps may be plotted in a common space. The Y-axis of graph 600 represents the flow rate at the suction port of an ejector or at the inlet of an engine-driven or electrically-driven pump in grams per second, and the X-axis of graph 600 represents vacuum at the suction port of an ejector or the inlet of an engine-driven or electrically-driven pump in terms of kPa below barometric pressure. As shown in graph 600, the flow rate at the suction port of an ejector may be decrease as the vacuum at the suction port of the ejector increases, and the flow rate at the inlet of an engine-driven or electrically-driven pump may also decrease as the vacuum at the inlet increases. Accordingly, the relationship between flow rate and vacuum for a given pump may be characterized by a function (e.g., functions $f_3$, $f_4$, and $f_5$ shown in FIG. 5). The function may be a linear approximation of a curve such as the curves shown in graph 600, or alternatively, the function may be non-linear which may more precisely model the flow rate/vacuum relationship for the pump.

For example, as described above with respect to FIG. 5, the mass air flow at each ejector may be a function $f_3$ of MEAS_BBVAC, MI_PRES, and MO_PRES for that ejector, where MO_PRES represents the pressure downstream of the ejector (e.g., at the motive outlet of the ejector). As shown in graph 600, for a given 1.5 mm ejector, the flow rate/vacuum characteristic is different for different downstream pressures (e.g., the characteristic for a 1.5 mm ejector at 10 kPa downstream pressure is different from the characteristic for a 1.5 mm ejector at 15 kPa downstream pressure). While characteristics for downstream pressure values of 10, 15, and 20 kPa are shown, it will be appreciated the control system may determine characteristics for other possible downstream pressure values using a functional expression, such that the behavior of the ejector may be determined for a currently sensed downstream pressure value. Whereas the slope of the characteristic is substantially the same for downstream pressure values of 10, 15, and 20 kPa, the X intercepts of the characteristics are larger for greater downstream pressure values, and smaller for smaller downstream pressure values. Accordingly, during conditions where downstream pressure is relatively high, the maximum ejector flow rate and maximum ejector vacuum may be larger than the maximum ejector flow rate and maximum ejector vacuum during conditions where downstream pressure is relatively low. Function $f_3$ may be a non-linear function of parameters MEAS_BBVAC, MI_PRES, and MO_PRES, or alternatively, function $f_3$ may be a linear function which is shifted along the X-axis depending on the downstream pressure value.

The functions representing vacuum-powered pump behavior may be stored in memory of the control system. In some examples, the functions used may be the original functions stored in memory during manufacturing of the engine, whereas in other examples, the functions may adapt to changes in pump behavior during the pump's life cycle. For example, a pump's behavior may be monitored, and functional expressions representing flow rate versus vacuum characteristics for the pump may be updated or calibrated when behavior of the pump changes (e.g., due to component degradation). In this way, adaptive learning may be used to improve the accuracy of the estimate of brake booster mass air flow, which may in turn improve the accuracy of the system in diagnosing whether a fault condition is present at the brake booster. It will be appreciated that the vacuum-powered pump characteristics shown in graph 600 are exemplary in nature; it will be appreciated that different pumps may have different characteristics, which may be used without departing from the scope of the invention.

It will be appreciated that the configurations and methods disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure

The invention claimed is:

1. A method for a vehicle engine brake booster (BB), comprising:
when brakes are not in use,
determining an expected BB mass air flow;
determining a measured BB vacuum; and
indicating BB degradation based on expected BB vacuum, the expected BB vacuum determined from expected mass air flow from the BB to the intake manifold when measured BB vacuum is less than intake manifold vacuum, and determined from expected mass air flow from the BB to one or more vacuum-powered pumps when measured BB vacuum is not less than intake manifold vacuum.

2. The method of claim 1, wherein expected BB vacuum is further based on BB volume, further comprising comparing expected BB vacuum with measured BB vacuum and indicating degradation when a difference between measured BB vacuum and expected BB vacuum exceeds a threshold.

3. The method of claim 2, wherein the one or more vacuum-powered pumps comprise one or more ejectors and expected mass air flow from the BB to each pump when measured BB vacuum is not less than intake manifold vacuum is based on measured BB vacuum and pump motive inlet and outlet pressures.

4. The method of claim 3, wherein expected mass air flow from the BB to each pump when measured BB vacuum is not less than intake manifold vacuum is based on measured BB vacuum, pump outlet pressure, and engine speed if the pump is an engine-driven pump, and on measured BB vacuum and pump outlet pressure if the pump is an electrically-driven pump.

5. The method of claim 4 further comprising, when measured BB vacuum is not less than intake manifold vacuum, computing expected BB mass air flow as a sum of the expected mass air flow(s) from the BB to the pump(s).

6. The method of claim 5, wherein computing expected BB mass air flow as a sum of expected mass air flow(s) from the BB to the pump(s) comprises summing expected mass air flow(s) from the BB to one or more of an ejector arranged in parallel with an intake compressor, an ejector arranged in parallel with an intake throttle, an ejector arranged at an outlet of an engine crankcase, an ejector arranged at an outlet of a fuel vapor purge system, an engine-driven pump, and an electrically-driven pump.

7. The method of claim 6, wherein the method is not performed when the brakes are in use.

8. The method of claim 7, wherein expected BB vacuum is independent of expected mass air flow from the BB to the pump(s) when measured BB vacuum is less than intake manifold vacuum.

9. A system for an engine, comprising:
a brake booster (BB) evacuated by an intake manifold and one or more vacuum-powered pumps; and a control system with computer readable instructions for:
   determining BB vacuum;
   determining BB volume;
   determining expected mass air flow from the BB to the intake manifold;
   determining expected mass air flow from the BB to one or more vacuum-powered pumps;
   computing expected BB vacuum based on BB volume, measured BB vacuum, and either expected mass air flow from the BB to the intake manifold or expected mass air flow from the BB to one or more vacuum-powered pumps;
   comparing the expected BB vacuum with the measured BB vacuum; and
   indicating BB degradation if the difference between measured BB vacuum and expected BB vacuum exceeds a threshold.

10. The system of claim 9, wherein the computation of expected BB vacuum is not performed during braking.

11. The system of claim 10, wherein the control system stores functional relationships between mass air flow and expected vacuum for each pump.

12. The system of claim 11, wherein the computation of expected BB vacuum is based on BB volume, measured BB vacuum, and expected mass air flow from the BB to the intake manifold during a first condition wherein measured BB vacuum is less than intake manifold vacuum, and wherein the computation of expected BB vacuum is based on measured BB vacuum and expected mass air flow from the BB to the pump(s) during a second condition wherein measured BB vacuum is not less than intake manifold vacuum.

13. The system of claim 12, wherein the computation of expected BB vacuum is independent of expected mass air flow from the BB to the pump(s) during the first condition, and wherein the computation of expected BB vacuum is independent of expected mass air flow from the BB to the intake manifold during the second condition.

14. The system of claim 13, wherein during the second condition, expected mass air flow from the BB to each pump is computed based on measured BB vacuum, and further based on pump motive inlet and outlet pressures if the pump is an ejector, pump outlet pressure and engine speed if the pump is an engine-driven pump, and pump outlet pressure if the pump is an electrically-driven pump.

15. A method for a vehicle engine brake booster (BB), comprising:
   when brakes are not in use,
   determining BB vacuum;
   determining BB volume;
   determining intake manifold vacuum;
   determining a measured BB vacuum;
   computing expected BB vacuum based on measured BB vacuum, BB volume, the computation further based on intake manifold vacuum when measured BB vacuum is less than intake manifold vacuum and on flow characteristics of one or more vacuum-powered pumps evacuating the BB when measured BB vacuum is not less than intake manifold vacuum; and
   comparing expected BB vacuum with measured BB vacuum and indicating a fault if a difference between measured BB vacuum and expected BB vacuum exceeds a threshold.

16. The method of claim 15, further comprising determining expected BB mass air flow, wherein expected BB vacuum is a function of expected BB mass air flow, and wherein expected BB mass air flow is a function of measured BB vacuum and either expected mass air flow from the BB to the intake manifold vacuum or expected mass air flow from the BB to the pump(s).

17. The method of claim 16, further comprising adjusting expected BB mass air flow based on mass air flow from one or more other vacuum consumers.

18. The method of claim 17 further comprising, when measured BB vacuum is not less than intake manifold vacuum, computing expected mass air flow from the BB to each vacuum-powered pump based on measured BB vacuum, the computation further based on pump motive inlet and outlet pressures if the pump is an ejector, pump outlet pressure and engine speed if the pump is an engine-driven pump, and pump outlet pressure if the pump is an electrically-driven pump.

19. The method of claim 18 further comprising, when measured BB vacuum is not less than intake manifold vacuum, computing expected BB mass air flow as a sum of expected mass air flow(s) from the BB to the pump(s).

20. The method of claim 19 further comprising, when measured BB vacuum is not less than intake manifold vacuum, computing expected BB mass air flow as a sum of expected mass air flow(s) from the BB to one or more of an ejector arranged in parallel with an intake compressor, an ejector arranged in parallel with an intake throttle, an ejector arranged at an outlet of an engine crankcase, an ejector arranged at an outlet of a fuel vapor purge system, an engine-driven pump, and an electrically-driven pump.

* * * * *